United States Patent [19]
Kujirai et al.

[11] Patent Number: 5,555,739
[45] Date of Patent: Sep. 17, 1996

[54] PIPING ARRANGEMENT OF AUTOMOTIVE AIR CONDITIONER

[75] Inventors: Toshisada Kujirai; Kaoru Ito; Yoshiaki Koga; Yutaka Moriyama; Norimitsu Takeshita; Yuji Ohira; Takahiro Ono, all of Tokyo, Japan

[73] Assignee: Calsonic Corporation, Tokyo, Japan

[21] Appl. No.: 361,840

[22] Filed: Dec. 22, 1994

[30] Foreign Application Priority Data

Dec. 22, 1993 [JP] Japan .................... 5-068696 U
Sep. 22, 1994 [JP] Japan .................... 6-228264

[51] Int. Cl.$^6$ .................................................. B60H 1/32
[52] U.S. Cl. .......................................... 62/244; 62/225
[58] Field of Search .......................... 62/239, 244, 225, 62/263; 236/92 B

[56] References Cited

U.S. PATENT DOCUMENTS

| | | | |
|---|---|---|---|
| 2,296,997 | 9/1942 | Knoy | 62/263 X |
| 2,525,868 | 10/1950 | Corhanidis | 62/263 |
| 2,655,009 | 10/1953 | Johnson | 62/239 X |
| 3,685,311 | 8/1972 | Bassett, Jr. | 62/239 X |
| 4,468,054 | 8/1984 | Orth | 285/137 R |
| 5,165,251 | 11/1992 | Tsukamoto et al. | 62/244 |

FOREIGN PATENT DOCUMENTS 3339214  5/1984  Germany.
63-96918  6/1988  Japan.

Primary Examiner—William E. Tapolcai
Attorney, Agent, or Firm—Foley & Lardner

[57] ABSTRACT

A cooler unit housing is located in a passenger room near a dashboard of a motor vehicle. A piping arrangement of the cooler unit comprises a pipe joint which is positioned at and supported by an opening of the dashboard. The pipe joint has a first face facing toward the passenger room and a second face facing toward the engine room. An expansion valve unit is connected to the first face of the pipe joint. Coolant inlet and output pipes are arranged, each having one end connected to an evaporator in the cooler unit housing and the other end led to the expansion valve unit. A grommet is disposed between a peripheral portion of the opening and an outer wall portion of the pipe joint thereby to establish sealing therebetween.

14 Claims, 7 Drawing Sheets

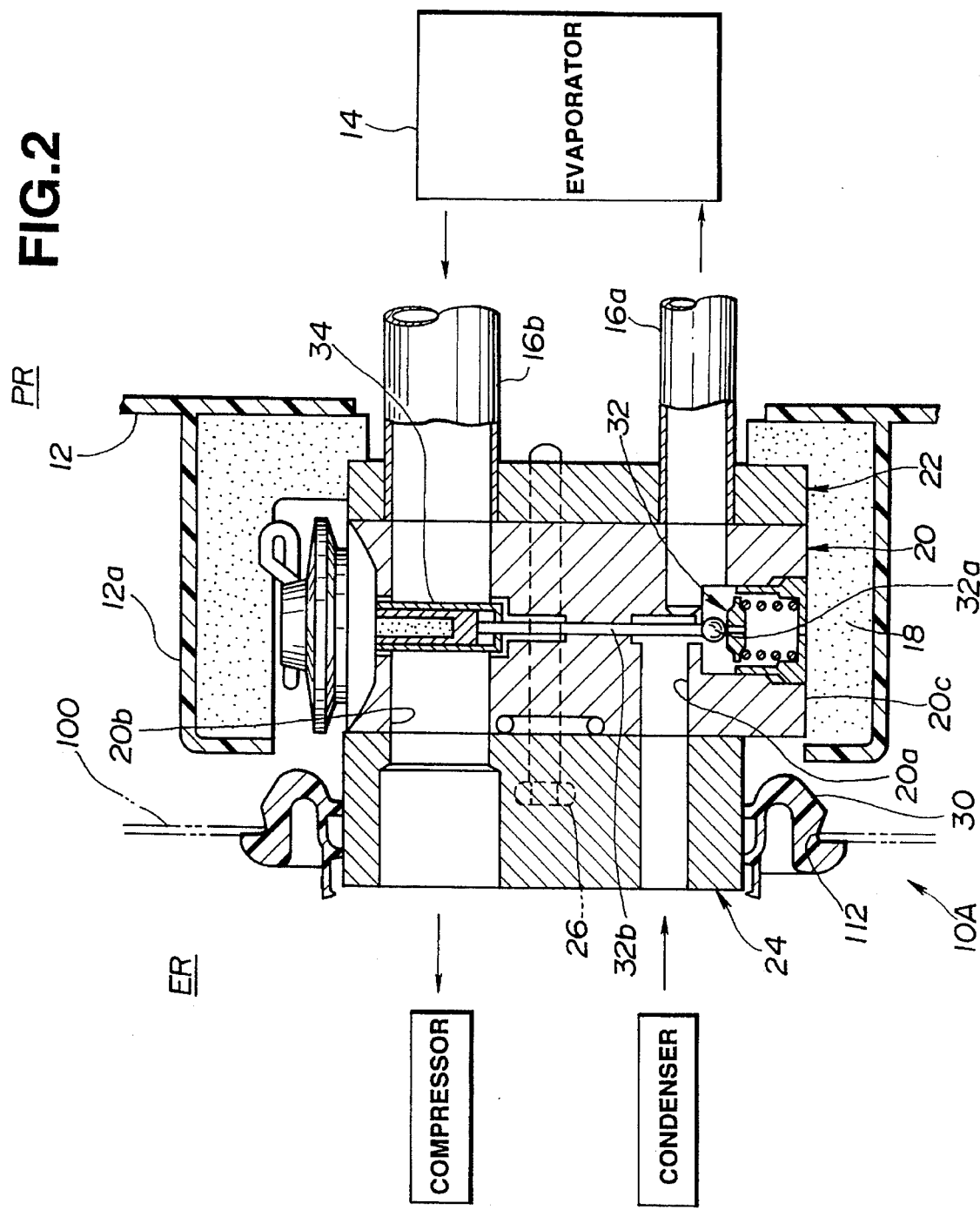

PIPING ARRANGEMENT OF AUTOMOTIVE AIR CONDITIONER

BACKGROUND OF THE INVENTION

1. Field of the Invention

The present invention relates in general to automotive air conditioners, and more particularly to piping arrangements of the automotive air conditioners. More specifically, the present invention is concerned with a piping arrangement of a cooler unit of the conditioner, which can minimize the resistance against air flow in a housing of the cooler unit.

2. Description of the Prior Art

In order to clarify the task of the present invention, one conventional piping arrangement of an automotive air conditioner will be briefly described with reference to FIG. 11 which is shown in Japanese Utility Model First Provisional Publication 63-96,918.

In the drawing, designated by 100 is a dashboard by which an engine room ER and a passenger room PR are bounded. A cooler unit housing 102 is arranged in the passenger room PR near the dashboard 100, which contains an evaporator 104. Air to be blown into the passenger room PR is forced to flow through a fin-unit face 104a of the evaporator 104. A first pipe unit 106 including a coolant inlet pipe 106a and a coolant outlet pipe 106b extends from a tank 104b of the evaporator 104. A second pipe unit 108 including a coolant inlet pipe 108a and a coolant outlet pipe 108b is connected to the first pipe unit 106 through a pipe joint 110. The second pipe unit 108 extends out of the cooler unit housing 102 to the engine room ER through an opening 112 formed in the dashboard 100. That is, the pipes 108a and 108b of the second pipe unit 108 are led to a condenser and a compressor respectively, which are both located in the engine room ER. An expansion valve unit 14 is connected to an exposed portion of the second pipe unit 108 in such a manner as to cover the opening 112 of the dashboard 100. Because the expansion valve unit 114 is not placed within the cooler unit housing 102, the air resistance in the cooler unit housing 102 can exhibit a satisfied low level.

However, in this conventional piping arrangement, usage of the second pipe unit 108 is necessary for connecting the first pipe unit 106 and the expansion valve unit 114, which induces not only increase in number of parts used but also difficulty in assembling the air conditioner.

Due to the inevitable shorter length of the first pipe unit 106, the hand work for connecting the second pipe unit 108 to the first pipe unit 106 tends to apply an abnormal stress to the portion where the coolant inlet and outlet pipes 106a and 106b are welded to the tank 104b of the evaporator 104.

Furthermore, in this conventional piping arrangement, the sealing at the opening 112 of the dashboard 100 is given little thought. In fact, in such piping arrangement, it is difficult to put the pipes 108a and 108b through the opening 112 with a satisfied sealing therebetween. As is known, if the sealing is not sufficient, noise in the engine room ER is easily transmitted to the passenger room PR.

SUMMARY OF THE INVENTION

It is therefore an object of the present invention to provide a piping arrangement of automotive air conditioner, which is free of the above-mentioned drawbacks.

According to the present invention, there is provided an arrangement in a motor vehicle having a dashboard by which an engine room and a passenger room are bounded and a cooler unit housing installed in the passenger room near the dashboard, the cooler unit housing containing an evaporator. The arrangement comprises means defining in the dashboard an opening; a pipe joint positioned at and supported by the opening of the dashboard, the pipe joint having a first face facing toward the passenger room and a second face facing toward the engine room; an expansion valve unit connected to the first face of the pipe joint; coolant inlet and output pipes, each having one end connected to the evaporator and the other end led to the expansion valve unit; and a grommet disposed between a peripheral portion of the opening and an outer wall portion of the pipe joint thereby to establish sealing therebetween.

BRIEF DESCRIPTION OF THE DRAWINGS

Other objects and advantages of the present invention will become apparent from the following description when taken in conjunction with the accompanying drawings, in which:

FIG. 2 is an enlarged sectional view of an essential portion of the piping arrangement of the first embodiment;

DETAILED DESCRIPTION OF THE EMBODIMENTS

Figure 1:
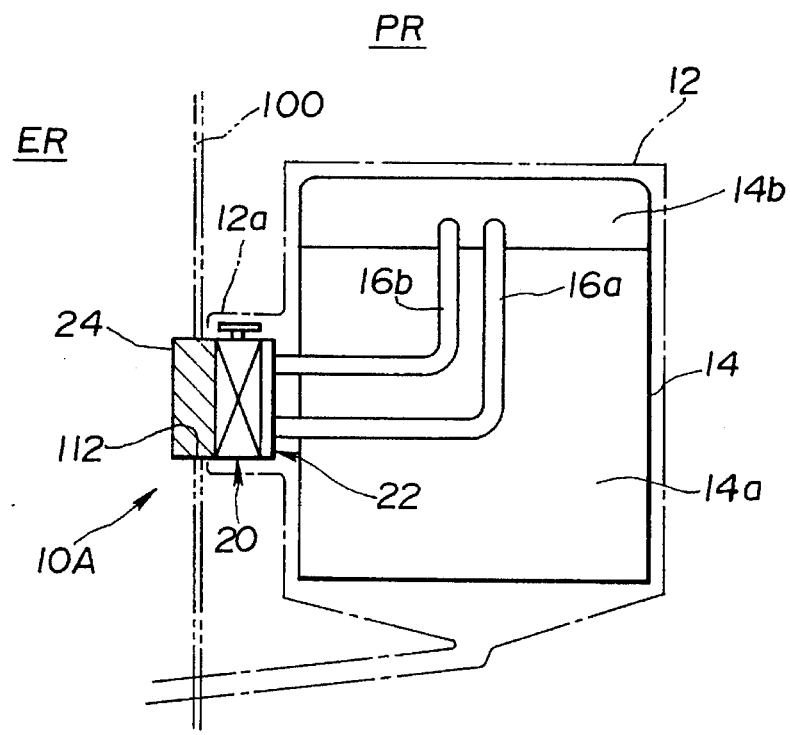
FIG. 1 is a schematic illustration of a piping arrangement of automotive air conditioner, which is a first embodiment of the present invention.

Referring to FIGS. 1 and 2, there is shown a first embodiment of the present invention, which is generally designated by 10A.

In the drawings, denoted by numeral 100 is a dashboard of an associated motor vehicle, by which an engine room ER and a passenger room PR are bounded. A cooler unit housing 12 is arranged in the passenger room PR near the dashboard 100, which contains an evaporator 14. Air to be blown into the passenger room PR is forced to flow through a fin-unit face 14a of the evaporator 14. A coolant inlet pipe 16a and a coolant outlet pipe 16b extend from a tank 14b of the evaporator 14 to a valve holding swelled portion 12a of the housing 12, which is directed toward an opening 112 of the dashboard 100.

As is seen from FIG. 2, the swelled portion 12a has a heat and sound insulating material 18 affixed to an inner surface thereof. The material 18 may be a foamed polyurethane or the like. Within the swelled portion 12a, there is installed an expansion valve unit 20 to which the coolant inlet and outlet pipes 16a and 16b are connected through a first pipe joint 22 which is also installed in the swelled portion 12a as shown. The first pipe joint 22 has been connected to the coolant inlet and outlet pipes 16a and 16b to constitute a pipe unit (22+16a+16b).

To an outside surface of the expansion valve unit 20, there is connected a second pipe joint 24 through which two through passages 20a and 20b of the valve 20 are connected through pipes (not shown) to a condenser and a compressor which are installed in the engine room ER. The first pipe joint 22, the expansion valve unit 20 and the second pipe joint 24 are connected together by a bolt 26.

As is seen from FIG. 2, the second pipe joint 24 is located in the opening 112 of the dashboard 100 and a grommet 30 is put in the opening 112 to achieve sealing between the opening 112 of the dashboard 100 and the second pipe joint 24.

The expansion valve unit 20 is of a one-block type, which comprises a body 20c in which the two through passages 20a and 20b are defined. In the passage 20a, there is operatively installed a valve unit 32. A valve stem 32b of the valve unit 32 extends to a thermal expansion unit 34 which is operatively installed in the other through passage 20b. Thus, the open degree of the valve unit 32 is controlled in accordance with the temperature of the coolant flowing in the through passage 20b.

The construction of the one-block type expansion valve unit 20 is described in detail in the afore-mentioned Japanese Publication 63-96,918.

In order to assemble the cooler unit to the motor vehicle, the following steps are preferably taken.

First, the expansion valve unit 20 and the first pipe joint 22 are put into the swelled portion 12a of the housing 12, and the housing 12 is so oriented that the swelled portion 12a is directed toward the opening 112 of the dashboard 100. Then, respective pipes (not shown) from the compressor and the condenser, which are installed in the engine room ER, are connected to the second pipe joint 24. From the engine room ER, the second pipe joint 24 is thrust into the grommet 30 which has been put in the opening 112 of the dashboard 100. Then, the second pipe joint 24, the expansion valve unit 20 and the first pipe joint 22 are connected tightly by the bolt 26 which is handled from the engine room ER.

In the following, advantages of the first embodiment 10A will be described.

Figure 10:
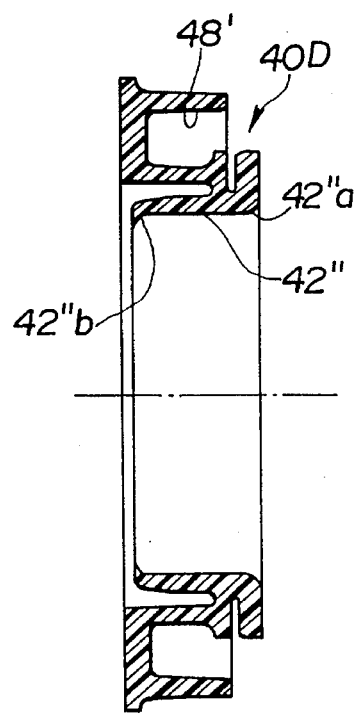
FIG. 10 is a view similar to FIG. 7, but showing a further grommet usable in the third embodiment.
Figure 11:
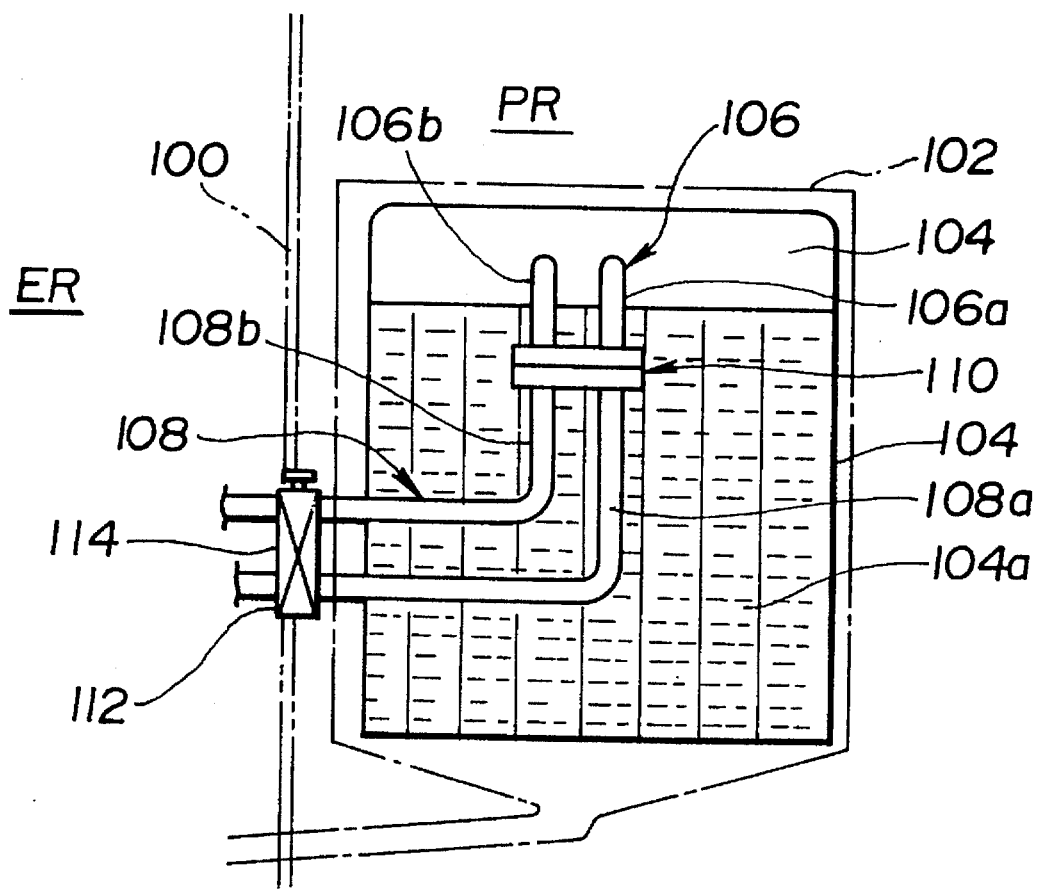
FIG. 11 is a schematic illustration of a conventional piping arrangement of automotive air conditioner.

Unlike the case of the above-mentioned conventional pipe arrangement of FIG. 10, there is no need of using the second pipe unit 108.

Because the coolant inlet and outlet pipes 16a and 16b are long enough as compared with the first pipe unit 106 of the conventional arrangement of FIG. 10, the hand work for connecting the pipes 16a and 16b to the expansion valve unit 20 applies substantially no stress to the portion where the pipes 16a and 16b are welded to the tank 14b of the evaporator 14. In fact, the elongate construction of a unit consisting of the inlet and outlet pipes 16a and 16b can effectively absorb the stress by its flexibility.

Due to provision of the grommet 30, the sealing between the second pipe joint 24 and the opening 112 of the dashboard 100 is assured.

Figure 3:
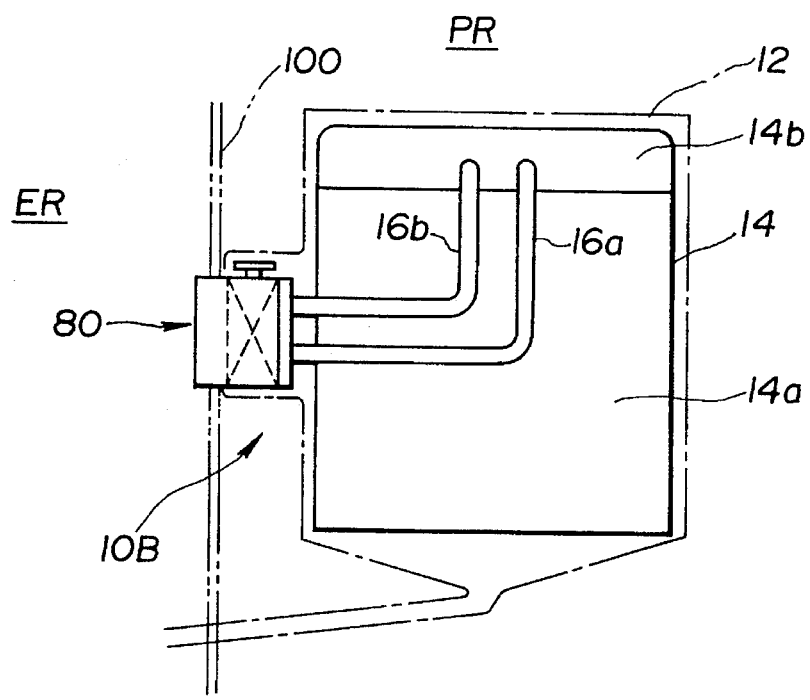
FIG. 3 is a view similar to FIG. 1, but showing a second embodiment of the present invention.

Referring to FIG. 3, there is shown a second embodiment of the present invention, which is generally designated by 10B.

In this embodiment, the expansion valve unit 20 and the second pipe joint 24 are integrally connected to constitute a one-block unit 80. Due to reduction in number of parts used, the work for assembling the air conditioner is facilitated.

Figure 4:
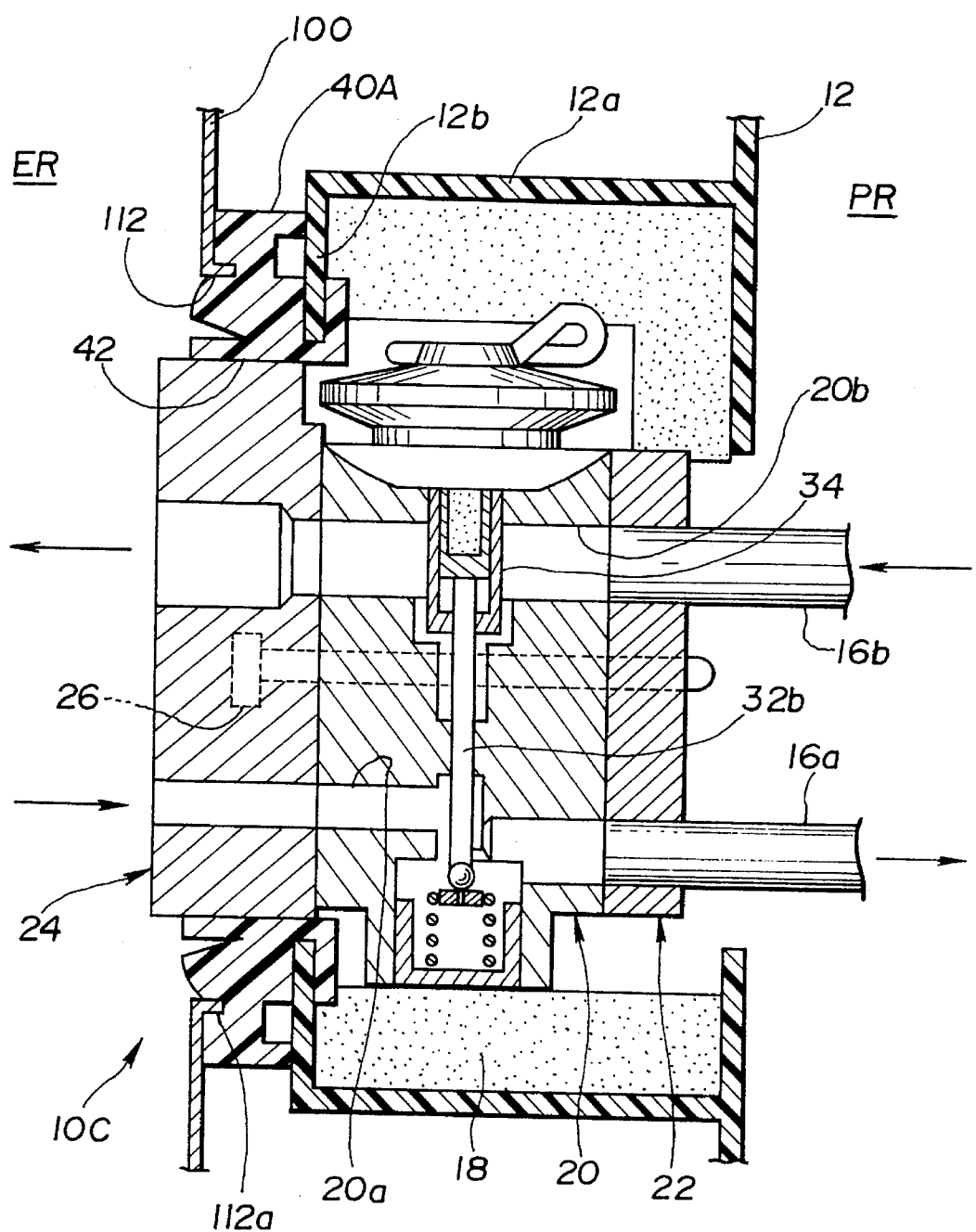
FIG. 4 is a view similar to FIG. 2, but showing a third embodiment of the present invention.

Referring to FIGS. 4 to 7, particularly FIG. 4, there is shown a third embodiment of the present invention, which is generally designated by numeral 10C.

This third embodiment 10C is substantially the same as the above-mentioned first embodiment 10A of FIG. 2 except for the arrangement of a grommet put in the opening 112 of the dashboard 100. Thus, only the arrangement of the grommet will be described in detail in the following, and parts substantially the same as those of the first embodiment 10A of FIG. 2 are designated by the same numerals.

Figure 6A:
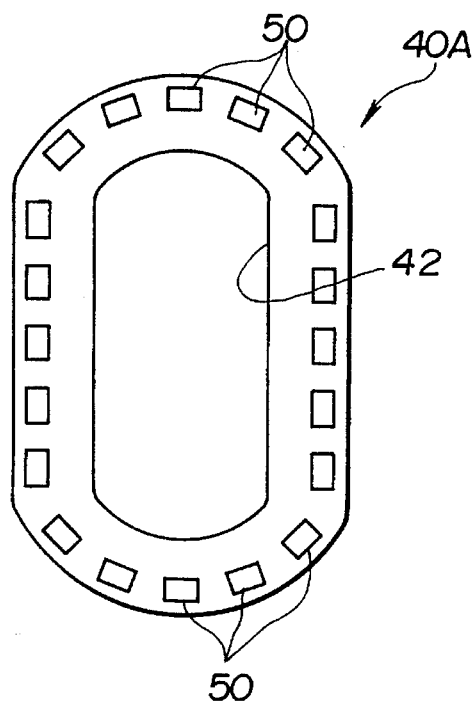
FIGS. 6A and 6B are plan and back views of the grommet of FIG. 5.
Figure 6B:
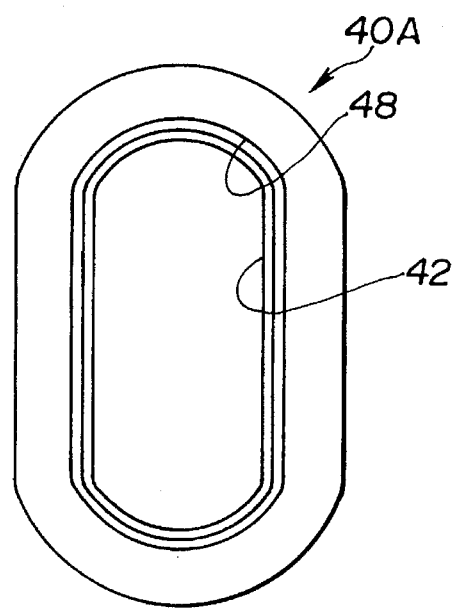

As is seen from FIG. 4, a grommet 40A employed in the third embodiment has a portion engaged with the valve holding swelled portion 12a of the housing 12, and as is seen from FIGS. 6A and 6B, the grommet 40A is shaped to have an elliptic cross section. For engagement with the grommet 40A, the opening 112 of the dashboard 100 is shaped elliptic and has an elliptic flange 112a projected from a peripheral portion thereof toward the swelled portion 12a, and the swelled portion 12a is formed at its leading end with an inwardly extending elliptic wall 12b.

Figure 5:
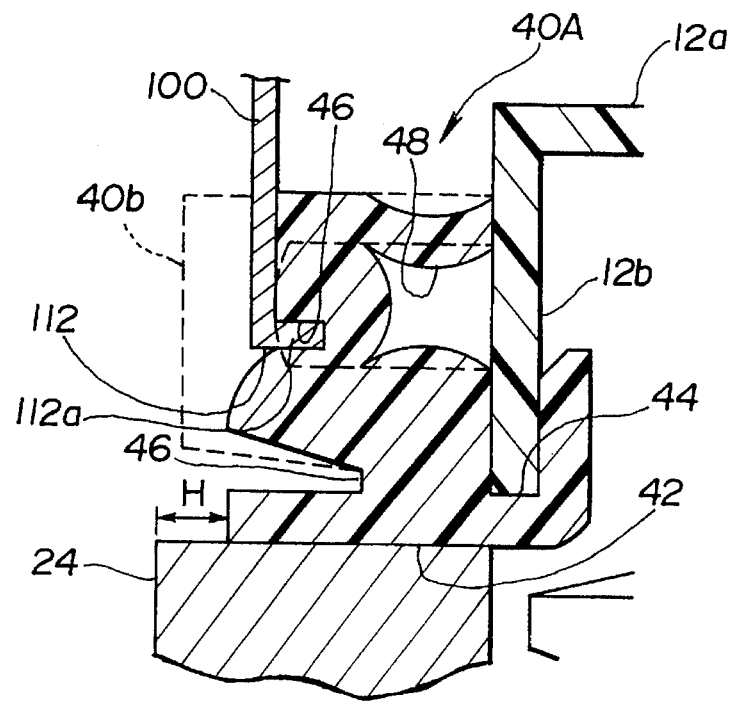
FIG. 5 is an enlarged sectional view of a grommet employed in the third embodiment.
Figure 7:
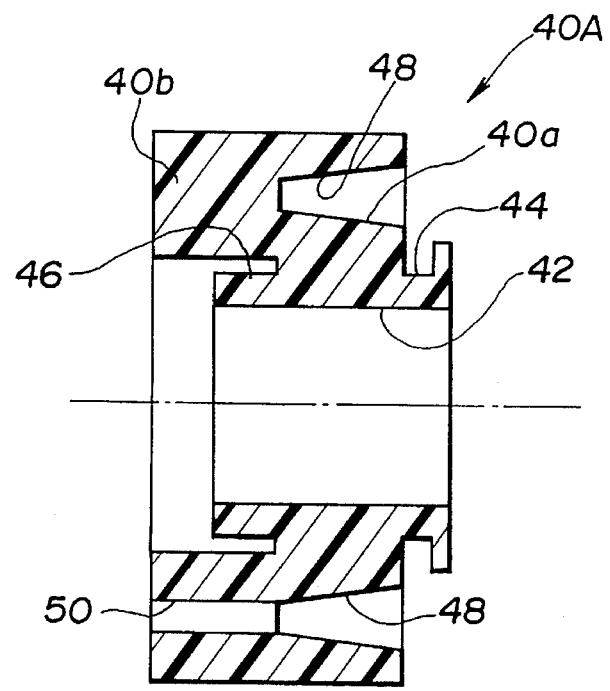
FIG. 7 is a sectional view of the grommet of FIG. 5 in a condition wherein no stress is applied to the grommet.

The grommet 40A is shown in FIGS. 5 to 7. As is clearly seen from FIG. 6A, 6B and 7, the grommet 40A is shaped into an elliptic cylinder. The grommet 40A is constructed of EPDM (ethylene propylene dien monomer) having a density greater than $0.28g/cm^3$, preferably $0.5g/cm^3$.

As is seen from FIG. 7, the grommet 40A has an elliptic center bore 42 which extends axially. A first groove 44 is provided around one axial end portion of a body of the grommet 40A, which has a depth in a direction perpendicular to the axis of the grommet 40A. A second groove 46 is provided around the other axial end portion of the body of the grommet 40A, which has a depth in a direction parallel to the axis of the grommet 40A and faces leftward in the drawing. A third groove 48 is provided around an axially middle swelled portion 40a of the body of the grommet 40A, which has a depth in a direction parallel to the axis of the grommet 40A and faces rightward in the drawing. The third groove 48 has a trapezoidal cross section. The axially middle swelled portion 40a has an extension 40b which projects leftward, as viewed in FIG. 7, in a manner to surround the second groove 46 as shown.

As is seen from FIGS. 6A and 7, a plurality of openings 50 are formed in the extension 49b, which extend to the third groove 48.

As is understood from FIG. 5, upon assembly, the first groove 44 receives a leading end of the wall 12b of the swelled portion 12a of the cooler unit housing 12. The first groove 44 is so sized as to allow the leading end of the wall 12b to compress the grommet 40A at a compression ratio smaller than 30%. The second groove 46 receives the flange 112a of the opening 112 of the dashboard 100. The extension 40b of the grommet 40A is so sized as to compress the grommet 40A (viz., a portion defined between the dashboard 100 and the wall 12b) at a compression ratio between 5% to 60%, preferably between 10% to 50%. Furthermore, upon assembly, an offset portion "H" is provided between an edge of the second pipe joint 24 and an axial end of the grommet 40A. The length of the offset portion "H" is greater than 2mm, preferably 5mm.

In the following, advantages of the third embodiment 10C will be described.

Because the clearance between the dashboard 100 and the swelled portion 12a of the cooler unit housing 12 is sealed by the grommet 40A in addition to the clearance between the dashboard 100 and the second pipe joint 24, the effect of blocking the noise from transmitting from the engine room ER to the passenger room PR is much assured.

Due to provision of the third groove 48 and the openings 50, the elasticity of the grommet 40A in the axial direction can be easily adjusted to a desired degree.

Figure 8:
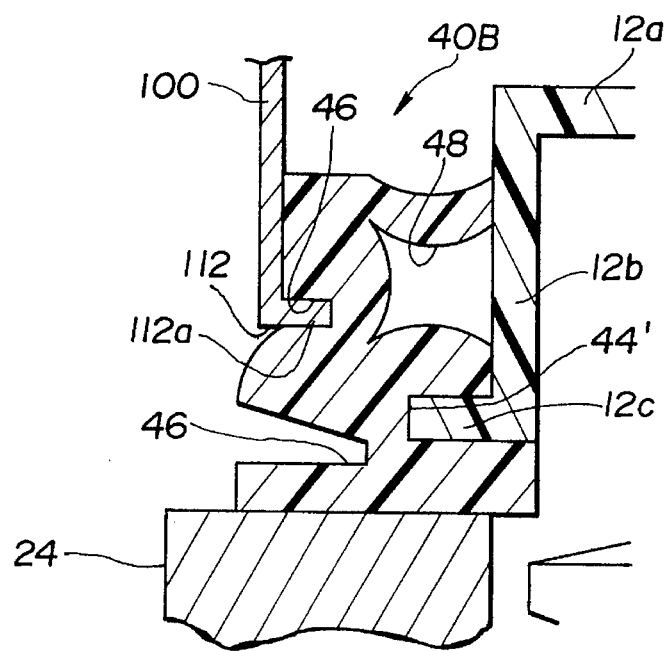
FIG. 8 is a view similar to FIG. 5, but showing another grommet usable in the third embodiment.

Referring to FIG. 8, there is shown another grommet 40B which can be used in the third embodiment 10C of the present invention. Since the grommet 40B is similar to the above-mentioned grommet 40A, only portions different from those of the grommet 40A will be described in the following.

That is, in this grommet 40B, the first groove 44' is constructed to have a depth in a direction parallel to the axis of the grommet 40B. The elliptic wall 12b of the cooler unit housing 12 thus has a flange 12c which is to be received in the first groove 44'.

Figure 9:
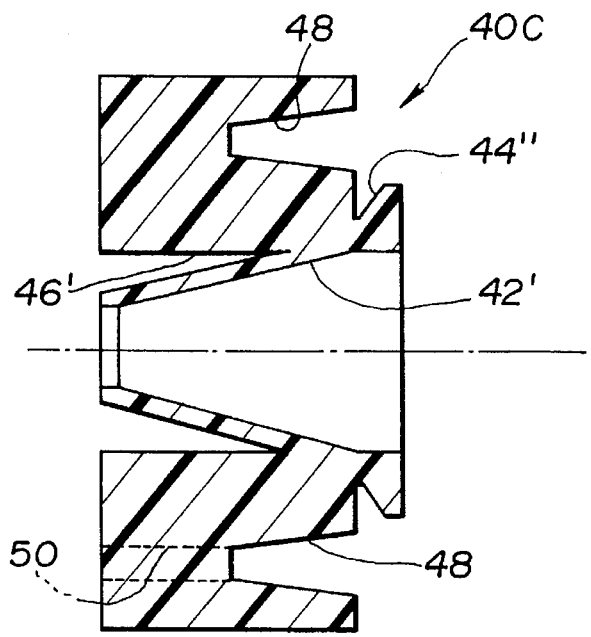
FIG. 9 is a view similar to FIG. 7, but showing still another grommet usable in the third embodiment.

Referring to FIG. 9, there is shown still another grommet 40C which can be used also in the third embodiment of the present invention. Since the grommet 40C is similar to the above-mentioned grommet 40A, only portions different from those of the grommet 40A will be described in the following.

That is, in the grommet 40C, the center bore 42' is conical in shape and the first and second grooves 44" and 46' have each a triangular cross section.

Referring to FIG. 10, there is shown a further grommet 40D which can be used also in the third embodiment of the present invention. Since the grommet 40D is similar to the above-mentioned grommet 40A, only portions different from those of the grommet 40A will be described in the following.

That is, in the grommet 40D, the center bore 42" is tapered at one axial end 42"a and is formed at the other axial end with a lip 42"b. The third groove 48' has a rectangular cross section.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In a motor vehicle having a dashboard by which an engine room and a passenger room are bounded and a cooler unit housing installed in said passenger room near said dashboard, said cooler unit housing containing an evaporator, the improvement comprising an arrangement comprising:

means defining in said dashboard an opening;

a pipe joint positioned at and supported by the opening of said dashboard, said pipe joint having a first face facing toward said passenger room and a second face facing toward said engine room;

an expansion valve unit connected to said first face of said pipe joint;

coolant inlet and output pipes, each having one end connected to said evaporator and the other end to said expansion valve unit;

a grommet disposed between a peripheral portion of said opening and an outer wall portion of said pipe joint thereby to establish sealing therebetween means for establishing a fluid communication between said expansion valve unit and given essential parts of a cooling system which are installed in said engine room;

a swelled portion integrally defined by said cooler unit housing, said swelled portion being directed toward said opening and housing therein said expansion valve unit; and a heat and sound insulating material disposed within said swelled portion in a manner to cover said expansion valve unit.

2. An arrangement as claimed in claim 1, in which said coolant inlet and outlet pipes from said evaporator are connected to said expansion valve unit through another pipe joint which is also installed in said welled portion.

3. An arrangement as claimed in claim 2, in which said expansion valve unit and the two pipe joints are connected together by means of a single bolt.

4. An arrangement as claimed in claim 1, in which said pipe joint and said expansion valve unit are integrally connected to constitute a one-block unit.

5. An arrangement as claimed in claim 1, in which said heat and sound insulating material is a foamed polyurethane.

6. An arrangement as claimed in claim 1, in which said grommet has an extension portion which is engaged with said swelled portion to establish sealing therebetween.

7. An arrangement as claimed in claim 6, in which said grommet comprises:

a cylindrical body having an axially extending center bore;

means defining a first groove which is provided around one axial end portion of said cylindrical body, said first groove receiving a leading end of said swelled portion of said cooler unit housing;

means defining a second groove which is provided around the other axial end portion of said body, said second groove receiving the peripheral portion of the opening of said dashboard; and means defining a third groove which is provided around an axially middle swelled portion of said body.

8. An arrangement as claimed in claim 7, further comprising means for defining a plurality of openings which axially extend in said cylindrical body to said third groove to be merged therewith.

9. An arrangement as claimed in claim 8, in which:

said first groove has a depth in a direction perpendicular to the axis of the center bore of said cylindrical body;

said second groove has a depth in a direction parallel with the axis of said center bore; and said third groove has a depth in a direction parallel with the axis of said center bore, said second and third grooves facing in opposite directions.

10. An arrangement as claimed in claim 9, in which said first groove receives an inwardly extending wall which extends from said swelled portion of said cooler unit housing, and in which said second groove receives a flange which is projected from the peripheral portion of the opening of said dashboard.

11. An arrangement as claimed in claim 8, in which each of said first, second and third grooves has a depth in a direction parallel with the axis of said center bore of the body, said first and second grooves facing in opposite directions.

12. An arrangement as claimed in claim 11, in which said first groove receives a flange which extends from an inwardly extending wall of said swelled portion of said cooler unit housing, and in which said second groove receives a flange which is projected from the peripheral portion of the opening of said dashboard.

13. An arrangement as claimed in claim 10, in which the axially extending center bore of said cylindrical body has a conical cross section.

14. An arrangement as claimed in claim 10, in which the axially extending center bore of said cylindrical body is tapered at one axial end and formed at the other axial end with a lip.

* * * * *